(12) United States Patent
Kern et al.

(10) Patent No.: US 7,552,295 B2
(45) Date of Patent: Jun. 23, 2009

(54) MAINTAINING CONSISTENCY WHEN MIRRORING DATA USING DIFFERENT COPY TECHNOLOGIES

(75) Inventors: Robert Frederic Kern, Otter Rock, OR (US); Kenneth Wayne Boyd, Tucson, AZ (US); Gregory Edward McBride, Vail, AZ (US); Gail Andrea Spear, Tucson, AZ (US); Robert Francis Bartfai, Tucson, AZ (US); William Frank Micka, Tucson, AZ (US); Kenneth Fairclough Day, III, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 11/325,032

(22) Filed: Jan. 3, 2006

(65) Prior Publication Data

US 2007/0156983 A1    Jul. 5, 2007

(51) Int. Cl.
G06F 12/00 (2006.01)
G06F 13/00 (2006.01)
G06F 13/28 (2006.01)
G06F 15/167 (2006.01)
G06F 15/16 (2006.01)

(52) U.S. Cl. .............. 711/162; 709/213; 709/216; 709/217; 709/218; 709/219; 711/147; 711/161; 711/141

(58) Field of Classification Search .............. None
See application file for complete search history.

(56) References Cited

U.S. PATENT DOCUMENTS

| | | | |
|---|---|---|---|
| 5,592,618 A | * | 1/1997 | Micka et al. ............ 714/54 |
| 5,720,029 A | | 2/1998 | Kern et al. |
| 5,734,818 A | | 3/1998 | Kern et al. |
| 6,148,383 A | | 11/2000 | Micka et al. |
| 6,463,501 B1 | | 10/2002 | Kern et al. |

(Continued)

FOREIGN PATENT DOCUMENTS

JP    2003-099306    4/2003

OTHER PUBLICATIONS

IBM-TDB-NN9610187 integration of persistent memory data into real-time asynchronous direct access storage device remote copy Oct. 1996 vol. 39, issue 10 pp. 187-190.*

(Continued)

*Primary Examiner*—Sanjiv Shah
*Assistant Examiner*—Marwan Ayash
(74) *Attorney, Agent, or Firm*—David W. Victor; Konrad Raynes & Victor LLP

(57) ABSTRACT

Provided are a method, system, and program for maintaining consistency when mirroring data using different copy technologies. Update groups having updates to primary storage locations are formed using a first copy technology. The updates in the update groups are copied to secondary storage locations. Update groups having updates to primary storage locations are formed using a second copy technology, wherein the updates in the update groups are copied to secondary storage locations. Indication is made in a data structure of a time of an update in response to including the update in one of the update groups formed using the first copy technology. Indication is also made in the data structure of a time of the update group formed using the second copy technology.

21 Claims, 4 Drawing Sheets

U.S. PATENT DOCUMENTS

| | | | |
|---|---|---|---|
| 6,496,908 B1 * | 12/2002 | Kamvysselis et al. | 711/162 |
| 6,842,825 B2 | 1/2005 | Geiner et al. | |
| 6,842,834 B2 | 1/2005 | Crockett et al. | |
| 2004/0260735 A1 | 12/2004 | Martinez et al. | |
| 2005/0071708 A1 | 3/2005 | Bartfai et al. | |

OTHER PUBLICATIONS

A.C. Azagury et al., "Advanced functions for storage subsystems: Supporting continuous availability", IBM Systems Journal, vol. 42, No. 2, © 2003 IBM Corporation, pp. 268-279.

C. Warrick et al., "IBM TotalStorage Enterprise Storage Server: Implementing ESS Copy Services with IBM eServer zSeries", IBM Redbooks SG24-5680-04, Jul. 2004, © 2004 IBM Corporation, pp. i-xxviii and 207-272.

C. Warrick et al., "The IBM TotalStorage DS6000 Series: Copy Services in Open Environments", IBM Redbooks SG24-6783-00, Sep. 2005, © 2005 IBM Corporation, pp. i-xxii and 141-274.

Kern et al., "IBM Storage Infrastructure for Business Continuity", IBM Systems & Technology Group, Oct. 11, 2005, © 2005 IBM Corporation, pp. 1-41.

* cited by examiner

Session Information

MAINTAINING CONSISTENCY WHEN MIRRORING DATA USING DIFFERENT COPY TECHNOLOGIES

BACKGROUND OF THE INVENTION

1. Field of the Invention

The present invention relates to a method, system, and program for maintaining consistency when mirroring data using different copy technologies.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. Different copy technologies may be used for maintaining remote copies of data at a secondary site, such as International Business Machine Corporation's ("IBM") Extended Remote Copy (XRC), Coupled XRC (CXRC), Global Copy, and Global Mirror Copy. These different copy technologies are described in the IBM publications "The IBM TotalStorage DS6000 Series: Copy Services in Open Environments", IBM document no. SG24-6783-00 (September 2005) and "IBM TotalStorage Enterprise Storage Server: Implementing ESS Copy Services with IBM eServer zSeries", IBM document no. SG24-5680-04 (July 2004).

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices. In certain backup system, a sysplex timer is used to provide a uniform time across systems so that updates written by different applications to different primary storage devices use consistent time-of-day (TOD) value as a time stamp. The host operating system or the application may time stamp updates to a data set or set of data sets when writing such data sets to volumes in the primary storage. The integrity of data updates is related to insuring that updates are done at the secondary volumes in the volume pair in the same order as they were done on the primary volume. The time stamp provided by the application program determines the logical sequence of data updates.

In many application programs, such as database systems, certain writes cannot occur unless a previous write occurred; otherwise the data integrity would be jeopardized. Such a data write whose integrity is dependent on the occurrence of a previous data write is known as a dependent write. Volumes in the primary and secondary storages are consistent when all writes have been transferred in their logical order, i.e., all dependent writes transferred first before the writes dependent thereon. A consistency group has a consistency time for all data writes in a consistency group having a time stamp equal or earlier than the consistency time stamp. A consistency group is a collection of updates to the primary volumes such that dependent writes are secured in a consistent manner. The consistency time is the latest time to which the system guarantees that updates to the secondary volumes are consistent. Consistency groups maintain data consistency across volumes and storage devices. Thus, when data is recovered from the secondary volumes, the recovered data will be consistent.

Consistency groups are formed within a session. All volume pairs assigned to a session will have their updates maintained in the same consistency group. Thus, the sessions are used to determine the volumes that will be grouped together in a consistency group. Consistency groups are formed within a journal device or volume. From the journal, updates gathered to from a consistency group are applied to the secondary volume. If the system fails while updates from the journal are being applied to a secondary volume, during recovery operations, the updates that did not complete writing to the secondary volume can be recovered from the journal and applied to the secondary volume.

Certain network environments may deploy different copy technologies to provide mirror copies of primary volumes in the network. Different copy technologies may form consistency groups using different methodologies and algorithms, such that consistency cannot be maintained across consistency groups formed using different copy technologies.

For these reasons there is a need in the art for improved techniques for managing consistency groups.

SUMMARY

Provided are a method, system, and program for maintaining consistency when mirroring data using different copy technologies. Update groups having updates to primary storage locations are formed using a first copy technology. The updates in the update groups are copied to secondary storage locations. Update groups having updates to primary storage locations are formed using a second copy technology, wherein the updates in the update groups are copied to secondary storage locations. Indication is made in a data structure of a time of an update in response to including the update in one of the update groups formed using the first copy technology. Indication is also made in the data structure of a time of the update group formed using the second copy technology.

DETAILED DESCRIPTION

Figure 1:
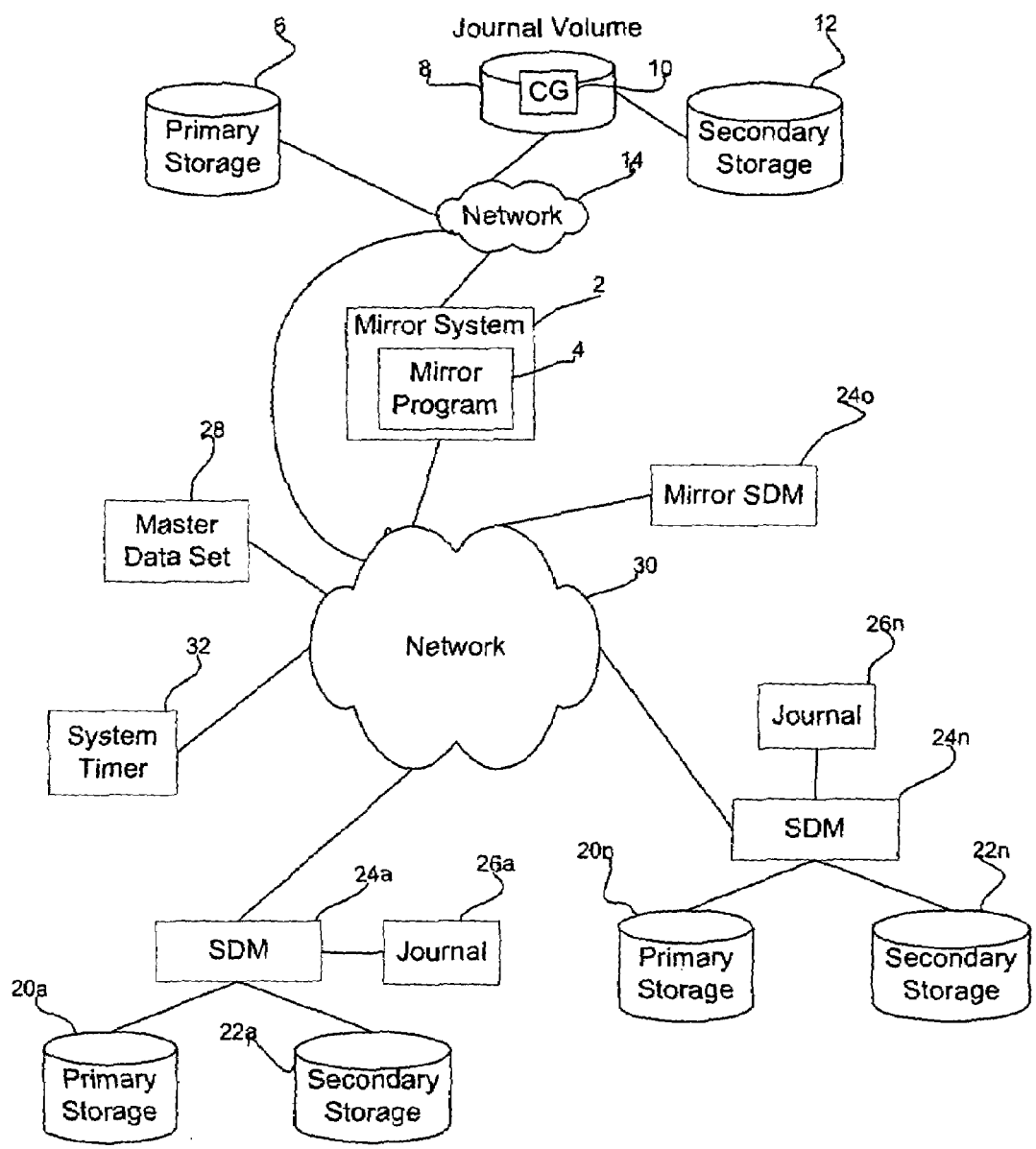
FIG. 1 illustrates an embodiment of a network computing environment.

FIG. 1 illustrates an embodiment of a network computing environment. A mirror system 2 includes a mirror program 4 to manage the copying of updates written by applications (not shown) to a primary storage 6 to a journal volume 8, which may be in a storage system at a remote site. Once the updates are copied to the journal volume 8 as of a point of time, those updates may be gathered into a consistency group (CG) 10. Once all the updates for a consistency group are gathered in the journal volume 8, another copy operation may be performed to copy the consistency group 10 to a secondary storage 12, which may be in a separate system. The mirror system 2, primary storage 6, journal volume 8, and secondary storage 12 may communicate over a network 14, such as a peer-to-peer network, storage area network (SAN), Local Area Network (LAN), Wide Area Network (WAN), etc. The primary storage 6 may be at a primary site and the journal volume 8 and secondary storage 12 may be at a secondary site, where the sites may be separated by a significant distance, e.g., hundreds or thousands of miles, to provide extended distance mirroring at the secondary site. Further, there may be primary and secondary storage controllers providing access to the primary 6 and secondary 12 storages.

The copy operation of the updates from the primary storage 6 to the journal volume 8 may comprise an asynchronous copy operation, such as a Peer-to-Peer Remote Copy-Extended Distance, Global Copy, Global Mirror, etc. To form a consistency group, the mirror program 4 may maintain a bitmap indicating updates to the primary storage 6. To complete the consistency group, the mirror program 4 may freeze or quiesce any updates to the primary storage 6 and then provide a new bitmap to use to record any subsequent updates to the primary storage 6. After establishing the new bitmap to record indication of any new updates to the primary storage 6, the mirror program 4 allows I/O to proceed against the primary storage 6. The previous bitmap, indicating updates that occurred prior to establishing the new bitmap, is then used to form the consistency group 10 at the journal volume 8 by asynchronously copying the updates indicated in the previous bitmap to the journal volume 8. Once all the data in the consistency group 10 is at the journal volume 8, the mirror program 4 may initiate the operation to copy the consistency group 10 to the secondary storage 12. The copy operation of the consistency group 10 from the journal volume 8 to the secondary storage 12 may comprise a logical copy operation, such as the IBM Flash Copy operation, in which the copy operation completes upon creating a bitmap identifying the tracks to copy. In one embodiment, the copy technology used to copy the changes to the primary storage 6 to the journal volume 8 and then secondary storage 12 may comprise the IBM Global Mirror copy operation, which involves an asynchronous remote copy of the updates for the consistency group from the primary storage 6 to the journal volume 8 at a secondary site and then a Flash Copy of the consistency group 10 to the secondary storage 6.

The copy operations managed by the mirror program 4 from the primary storage 6 to the secondary storage 12 comprise a first copy technology. A second copy technology may be deployed to copy data from the primary storages 20a . . . 20n to secondary storages 22a . . . 22n, such as the IBM Extended Remote Copy (XRC) copy technology. Both copy technologies form consistency groups for all updates to volumes that share a session. The consistency group contains records that have their order of update preserved, even across multiple storage controls. This preservation of order is crucial for applications that process dependent write I/Os such as index and data and database and log.

The second copy technology utilizes system data mover (SDM) programs 24a . . . 24n, 24o. The SDMs 24a . . . 24n are in communication with the primary 20a . . . 20n and secondary 22a . . . 22n storages, respectively, and manage the transfer of updates in consistency groups from the primary storage 20a . . . 20n to the corresponding secondary storage 22a . . . 22n. Thus, data is transferred between the primary 20a . . . 20n and secondary 22a . . . 22n storages via the SDMs 24a . . . 24n using the second copy technologies. At the primary storage 20a . . . 20n, updates may be written to a side file in a cache of a storage controller managing the primary storage 20a . . . 20n. The updates may then be transferred to the journals 26a . . . 26n maintained by the SDMs 24a . . . 24n. Within each of the journals 26a . . . 26n, the updates are arranged into a consistency group. The journals 26a . . . 26n may store one or more consistency groups. The SDMs 24a . . . 24o may comprise programs implemented in a system. The SDMs 24a . . . 24o may be implemented at the site of the primary storages, secondary storages or an independent site and system.

A master data set 28 includes a list of the sessions being managed and for each managed session, the time of the most recent update to a volume in such session. The master data set 28 may reside on volumes in the storages 20a . . . 20n, 22a . . . 22n. The journal data sets for a primary/secondary control pair may reside on any device. In FIG. 1, each SDM 24a . . . 24n, 24o is part of one session whose information is indicated in the master data set 28. Each session may be assigned one or more SDMs 24a . . . 24n. The master data set 28 further maintains session information for the copy operations being managed by the mirror program 4.

The mirror SDM 24o communicates with the mirror system 2 to coordinate the formation and transfer of consistency groups 20 with respect to the journal volume 8 and the secondary storage 12 using the second copy technology, e.g., Global Mirror, in a manner consistent with the writing of consistency groups by the SDMs 24a . . . 24n using the first copy technology, e.g., coupled XRC (CXRC). The SDM 24o writes a mirror journal time to the master data set 28 for the mirror session indicating a time of the last formed consistency group of updates at the primary storage 6 to copy to the journal volume 8. In certain embodiments, the first copy technology may form consistency groups at a substantially higher frequency than the second copy technology, which forms a consistency group when quiescing I/Os to the primary storage 6. Further, the SDMs 24a . . . 24n may journal updates in the master data set 28 at a substantially higher frequency than update times are journaled in the master data set 28 for the consistency group 10 being formed by the mirror program 4.

Network 30 provides communication among the SDMs 24a . . . 24n, 24o, storages 20a . . . 20n, 22a . . . 22n, the master data set 28, and a system timer 32. The system timer 30 provides the time stamps for updates to ensure that a common time is used across all SDMs 24a . . . 24o and to provide a common time reference for application programs writing updates to volumes to insure that updates are not mirrored out-of-sequence. Once updates in the journal 26a . . . 26n and journal volume 8 are organized within a consistency group, then the updates within a consistency are applied to the secondary storages 22a . . . 22n and 12 using the different copy technologies. The creation of consistency groups guarantees that the system will shadow data to a remote site in real time with update sequence integrity for any type of data. Using consistency groups ensure that updates applied to the secondary storages 12 and 22a . . . 22n within a session are consistent as of the consistency time of the consistency group and consistent between sessions. If a failure occurs while updates are written from the journal to secondary volumes in the secondary storage 22a . . . 22n, then during recovery, the updates that were interrupted during system failure can be recovered from the journal and reapplied to the secondary volume. In this way, data is consistent within and across sessions during recovery as of a point in time.

The networks 14 and 30 may be separate networks that are connected via one or more switches or part of the same network. The networks 14 and 30 may comprise a Storage Area Network (SAN), Local Area Network (LAN), Intranet, the Internet, Wide Area Network (WAN), peer-to-peer network, etc. The storages 20a . . . 20n, 22a . . . 22n may comprise an array of storage devices, such as a Just a Bunch of Disks (JBOD), Direct Access Storage Device (DASD), Redundant Array of Independent Disks (RAID) array, virtualization device, tape storage, flash memory, etc.

Figure 2:
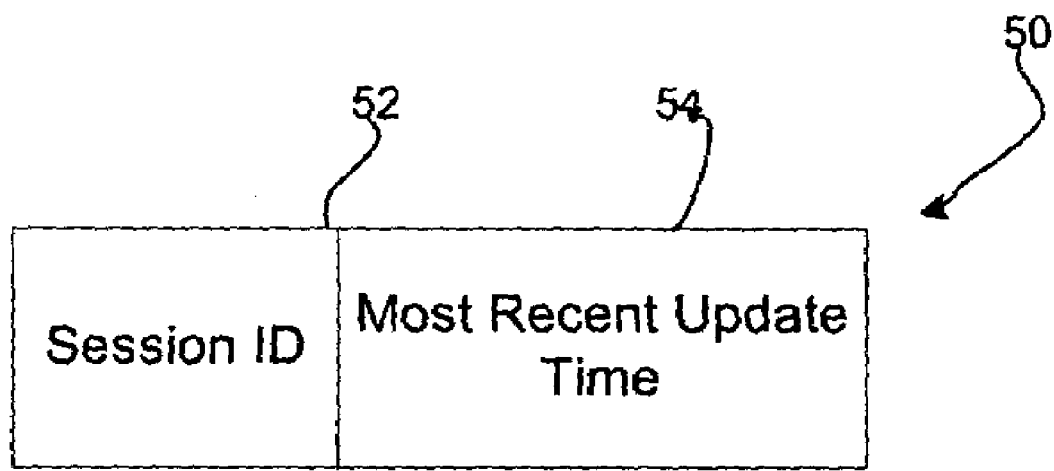
FIG. 2 illustrates an embodiment of information maintained in a master data set.

FIG. 2 illustrates an embodiment of information maintained in the master data set 28 for one session 50. A session may comprise the operations of a primary-secondary volume pairs managed by one or more SDMs 24a ... 24n and the volume pairs managed by the mirror program 4. The session update information 50 includes a session identifier 52 and a time of the last update 54 included in a consistency group. For the copy operations managed by the SDMs 24a ... 24n, the time 54 comprises the time of the last update added to a consistency group in the journal 26a ... 26n. For the copy operations managed by the mirror program 4, the last update time 54 may comprise the time of the consistency group 8 to form in the journal volume 8. This time of the consistency group 10 for the second copy technology, e.g., Global Mirror, may comprise the time that the mirror program 4 quiesces I/O to the primary storage 6 to form a new consistency group.

Figure 3:
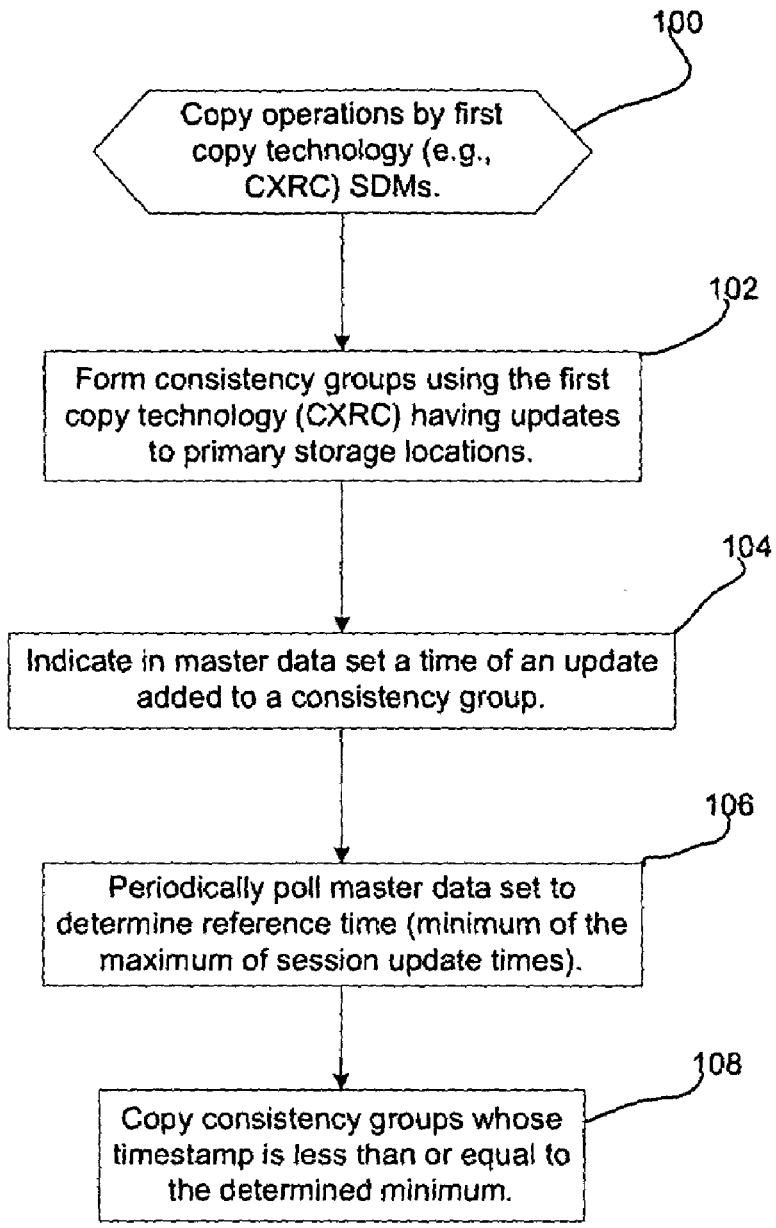
FIGS. 3 and 4 illustrate embodiments of operations to mirror a primary storage to a secondary storage using different copy technologies.

FIG. 3 illustrates an embodiment of operations performed by the SDMs 24a ... 24n copying data for different sessions using a first copy technology, e.g., XRC, CXRC, etc.

In response to initiating copy operations (at block 100), the SDMs 24a ... 24n form (at block 102) consistency groups using the first copy technology (XRC) having updates to primary storage locations. As discussed, the SDM 24a ... 24n may form the consistency groups by reading the updates from the primary storages 20a ... 20n to the journal 26a ... 26n where the consistency group is formed. The SDMs 24a ... 24n indicate (at block 104) in the master data set 28 a time of an update added to a consistency group in the journal 26a ... 26n. The SDMs 24a ... 24n may periodically poll (at block 106) the master data set 28 to determine a reference time (a minimum of the maximum of session update times 54). The SDMs 24a ... 24n copy (at block 108) consistency groups in their journals 26a ... 26n to the secondary storages 22a ... 222n whose timestamp is less than or equal to the determined reference time.

Figure 4:
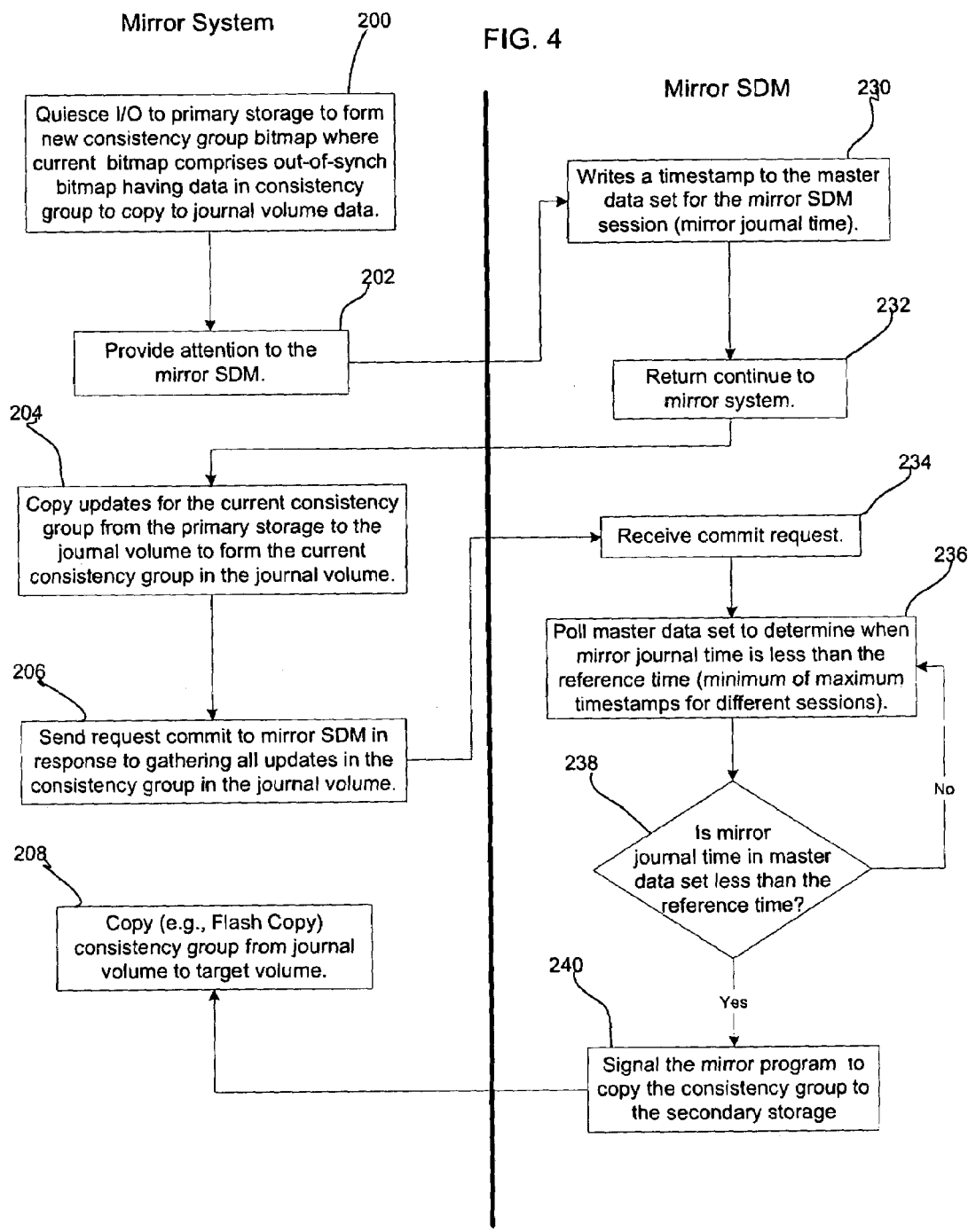

FIG. 4 illustrates an embodiment of operations performed by the mirror program 4 and mirror SDM 24o to coordinate how the mirror program 4 copies consistency groups 10 to the secondary storage 12 to ensure that the secondary storages 12, 22a ... 22n have consistency groups that are consistent as of a point in time, i.e., consistency is maintained across sessions and different copy technologies. The mirror program 4 performs the operations at blocks 200-208 and the mirror SDM 24o performs the operations at blocks 230-240. Control begins at block 200 when the mirror program 4 quiesces (at block 200) I/Os from hosts to the primary storage 20a ... 20n to form a new consistency group bitmap, where the bitmap for the last formed consistency group comprises an out-of-synch bitmap indicating updates in the primary storage 6 to copy to the journal volume 8 in which the consistency group 10 is formed. In response to establishing a consistency group, the mirror program 4 provides (at block 202) an attention to the mirror SDM 24o. In response to this attention, the mirror SDM 24o writes (at block 230) a timestamp based on the system timer 32 to the master data set 28 for the mirror SDM session (mirror journal time). The mirror journal time written to the master data set 28 comprises the time of the consistency group 10 whose updates are in the process of being copied from the primary storage 6 to the journal volume 8. The mirror SDM 24o returns (at block 232) continue to the mirror program 2.

In response to the continue, the mirror program 4 copies (at block 204) updates for the last consistency group formed (whose tracks may be indicated in an out-of-synch bitmap formed when the bitmap for the new consistency group was generated) from the primary storage 20a ... 20n to the journal volume 8 to form the last completed consistency group 10 in the journal volume 8. In response to gathering all the updates in the consistency group 10 in the journal volume 8, the mirror program 4 sends (at block 206) a commit request to the mirror SDM 24o. In response to receiving the commit request (at block 234), the mirror SDM 24o polls (at block 236) the master data set 28 to determine when the mirror journal time (time last consistency group formed by the mirror program 4 was completed) is less than the reference time (minimum of maximum update imestamps for different sessions, including the mirror session). If (at block 238) the mirror journal time in the master data set 28 is not less than the reference time, then control returns to block 236 to continue to poll. Otherwise, if (at block 238) the mirror journal time in the master data set 28 is less than the reference time, then the mirror SDM 24o signals (at block 240) the mirror program 4 to copy the consistency group 10 to the secondary storage 12. In response to this signal, the mirror program 4 initiates the copying (at block 208) of the consistency group 10 from the journal volume 8 to secondary storage 12. As discussed, the copy operation at block 208 of the consistency group 10 may comprise a logical copy operation, such as a FlashCopy operation.

The operations of FIGS. 3 and 4 consider the minimum of the most recent updates to each session. This ensures that when updates within one consistency group are applied to the secondary volume, that the journals 26a ... 26n and journal volume 8 maintain all updates across all sessions that occur prior to the time of the update being applied. In this way, if a failure occurs, updates can be recovered from the journal such that the recovered updates across all sessions and copy technologies are consistent as of a single point-in-time. In certain embodiments, the most recent update times for other sessions are only considered for those sessions that have had updates written to the journal. If a session has not had an update written to the journal, then that session will not be considered when making sure updates are consistent across sessions. In this way, dependent data that is dependent on earlier data would not be applied to the secondary volume until the earlier data on which the data depends is at least written to the journal.

Described embodiments provide techniques to ensure that updates in consistency groups formed using different copy technologies are copied to secondary storage locations to maintain data consistency across sessions and copy technologies, including copy technologies that use different techniques and methodologies to form consistency groups and form consistency groups at different frequencies.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3 and 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

forming update groups using a first copy technology having updates to a first primary storage locations, wherein the updates in the update groups are copied to first secondary storage locations;

forming update groups using a second copy technology having updates to a second primary storage locations, wherein the updates in the update groups are copied to a second secondary storage locations, wherein the first and second copy technologies perform different operations to copy the data from the primary to the secondary storage locations;

indicating, by the first copy technology, in a data structure a time of an update at the first primary storage locations in response to including the update in one of the update groups formed using the first copy technology;

indicating, by the second copy technology, in the data structure a time of the update at the second primary storage locations formed using the second copy technology;

determining, by the first copy technology, a first consistency group of updates to the first primary storage locations having times less than a reference time based on the times indicated in the data structure;

determining, by the second copy technology, a second consistency group of updates to the second primary storage locations having times less than the reference time based on the times indicated in the data structure;

copying, by the first copy technology, the first consistency group to the first secondary storage locations; and coordinating, by the second copy technology, with the first copy technology by:

signaling, by the second copy technology, to the first copy technology, in response to forming the consistency group;

writing, by first copy technology, a timestamp to the data structure; and returning, by first copy technology, a continue to the second copy technology;

copying, by the second copy technology, the second consistency group to the second secondary storage locations, in response to the continue from the first copy technology, wherein the first and second consistency groups copied to the first and second secondary storage locations maintain consistency across the first and second copy technologies, wherein the first copy technology forms consistency groups at a substantially higher frequency than the second copy technology.

2. The method of claim 1, wherein a plurality of system data movers use the first copy technology to form consistency groups of updates to copy from the primary storage locations to the secondary storage locations, further comprising:
determining a maximum time indicated in the data structure for each of the system data movers, wherein the reference time comprises a minimum of the determined maximum times and the time of the consistency group formed by the second copy technology indicated in the data structure.

3. The method of claim 2, further comprising:
signaling the second copy technology system to copy the updates in the consistency group formed using the second copy technology to the secondary storage locations in response to determining that the time indicated in the data structure for the consistency group formed using the second copy technology is less than the reference time.

4. The method of claim 1, wherein the first copy technology forms consistency groups by a system data mover reading the updates to the primary storage locations, wherein the system data mover indicates in the data structure the time of a recent update added to one consistency group, and wherein the second copy technology forms a Previously Presented consistency group by quiescing application access to the source storage locations.

5. The method of claim 1,
wherein the second copy technology coordinates with a mirror implementation of the first copy technology to copy the second consistency group to the second secondary storage locations.

6. The method of claim 1, wherein the first and second copy technologies operate in different sessions, and wherein the first and second consistency groups are copied by the first and second copy technologies to maintain data consistency across sessions and copy technologies.

7. The method of claim 1, wherein the first and second copy technologies comprise asynchronous copy technologies that perform copy operations differently.

8. An article of manufacture comprising a physical computer readable storage medium having a first copy program and second copy program to copy updates from primary storage locations to secondary storage locations, wherein the first copy program and second copy program are executed to perform operations, the operations comprising:
forming, by the first copy program, update groups using a first copy technology having updates to a first primary storage locations, wherein the updates in the update groups are copied to first secondary storage locations;
forming, by the second copy program, update groups using the second copy technology having updates to a second primary storage locations, wherein the updates in the update groups are copied to a second secondary storage locations, wherein the first copy program uses the first copy technology to perform operations and the second copy program uses the second copy technology to perform operations, and wherein the first and second copy technologies perform different operations to copy the data from the primary to the secondary storage locations;
indicating, by the first copy program, in a data structure a time of an update at the first primary storage locations in response to including the update in one of the update groups formed using the first copy technology;
indicating, by the second copy program, in the data structure a time of the update at the second primary storage locations formed using the second copy technology; p1 determining, by the first copy program, a first consistency group of updates to the first primary storage locations having times less than a reference time based on the times indicated in the data structure;
determining, by the second copy program, a second consistency group of updates to the second primary storage locations having times less than the reference time based on the times indicated in the data structure;
copying, by the first copy program, the first consistency group to the first secondary storage locations; and
coordinating, by the second copy program, with the first copy program by:
signaling, by the second copy program, the first copy program, in response to forming the consistency group;
writing, by the first copy program, a timestamp to the data structure; and
returning, by first copy program, a continue to the second copy program;
copying, by the second copy program, the second consistency group to the second secondary storage locations, in response to the continue from the first copy program, wherein the first and second consistency groups copied to the first and second secondary storage locations maintain consistency across the first and second copy technologies, wherein the first copy technology forms consistency groups at a substantially higher frequency than the second copy technology.

9. The article of manufacture of claim 8, wherein a plurality of system data movers use the first copy technology to form consistency groups of updates to copy from the primary storage locations to the secondary storage locations, wherein the operations further comprise:
determining a maximum time indicated in the data structure for each of the system data movers, wherein the reference time comprises a minimum of the determined maximum times and the time of the consistency group formed by the second copy technology indicated in the data structure.

10. The article of manufacture of claim 9, wherein the operations further comprise:
signaling the second copy technology system to copy the updates in the consistency group formed using the second copy technology to the secondary storage locations in response to determining that the time indicated in the data structure for the consistency group formed using the second copy technology is less than the reference time.

11. The article of manufacture of claim 8, wherein the first copy technology forms consistency groups by a system data mover reading the updates to the primary storage locations, wherein the system data mover indicates in the data structure the time of a recent update added to one consistency group, and wherein the second copy technology forms a Previously Presented consistency group by quiescing application access to the source storage locations.

12. The article of manufacture of claim 8, wherein the second copy technology coordinates with a mirror implementation of the first copy technology to copy the second consistency group to the second secondary storage locations.

13. The article of manufacture of claim 8, wherein the first and second copy technologies operate in different sessions, and wherein the first and second consistency groups are copied by the first and second copy technologies to maintain data consistency across sessions and copy technologies.

14. The article of manufacture of claim 8, wherein the first and second copy technologies comprise asynchronous copy technologies that perform copy operations differently.

15. A system implemented in a network including primary storage locations and secondary storage locations, comprising:
 a data structure;
 a first system including a first physical computer readable storage medium having a first copy program that is executed to cause the first system to perform operations comprising:
  forming update groups using a first copy technology having updates to a first primary storage locations, wherein the updates in the update groups are copied to first secondary storage locations;
  indicating, by the first copy technology, in a data structure a time of an update at the first primary storage locations in response to including the update in one of the update groups formed using the first copy technology;
  determining, by the first copy technology, a first consistency group of updates to the first primary storage locations having times less than a reference time based on the times indicated in the data structure;
  copying, by the first copy technology, the first consistency group to the first secondary storage locations; and
 a second system including a second physical computer readable storage medium having a second copy program that is executed to cause the second system to perform operations comprising:
  forming update groups using a second copy technology having updates to a second primary storage locations, wherein the updates in the update groups are copied to a second secondary storage locations, wherein the first and second copy technologies perform different operations to copy the data from the primary to the secondary storage locations;
  indicating, by the second copy technology, in the data structure a time of the update at the second primary storage locations formed using the second copy technology;
  determining, by the second copy technology, a second consistency group of updates to the second primary storage locations having times less than the reference time based on the times indicated in the data structure;
 wherein the first and second copy programs coordinate using the first and second copy technologies, respectively, by:
  signaling, by the second copy program, the first copy program, in response to forming the consistency group;
  writing, by the first copy program, a timestamp to the data structure; and
  returning, by the first copy program, a continue to the second copy program;
  copying, by the second copy program, the second consistency group to the second secondary storage locations, in response to the continue from the first copy program, wherein the first and second consistency groups copied to the first and second secondary storage locations maintain consistency across the first and second copy technologies, wherein the first copy technology forms consistency groups at a substantially higher frequency than the second copy technology.

16. The system of claim 15, wherein the first system comprises a system data mover, further comprising:
 a plurality of system data movers, including the first system, using the first copy technology to form consistency groups of updates to copy from the primary storage locations to the secondary storage locations, wherein the system data movers further perform:
  determining a maximum time indicated in the data structure for each of the system data movers, wherein the reference time comprises a minimum of the determined maximum times and the time of the consistency group formed by the second copy technology indicated in the data structure.

17. The system of claim 16, further comprising:
 a third system including a third copy program to perform operations comprising signaling the second copy program to copy the updates in the consistency group formed using the second copy technology to the secondary storage locations in response to determining that the time indicated in the data structure for the consistency group formed using the second copy technology is less than the reference time.

18. The system of claim 15, wherein the first copy technology forms consistency groups by a system data mover reading the updates to the primary storage locations, wherein the system data mover indicates in the data structure the time of a recent update added to one consistency group, and wherein the second copy technology forms a consistency group by quiescing application access to the source storage locations.

19. The system of claim 15, wherein the second copy program coordinates with a mirror implementation of the first copy program to copy the second consistency group to the second secondary storage locations.

20. The system of claim 15, wherein the first and second copy technologies operate in different sessions, and wherein the first and second consistency groups are copied by the first and second copy technologies to maintain data consistency across sessions and copy technologies.

21. The method of claim 15, wherein the first and second copy technologies comprise asynchronous copy technologies that perform copy operations differently.

* * * * *